Patented Apr. 17, 1923.

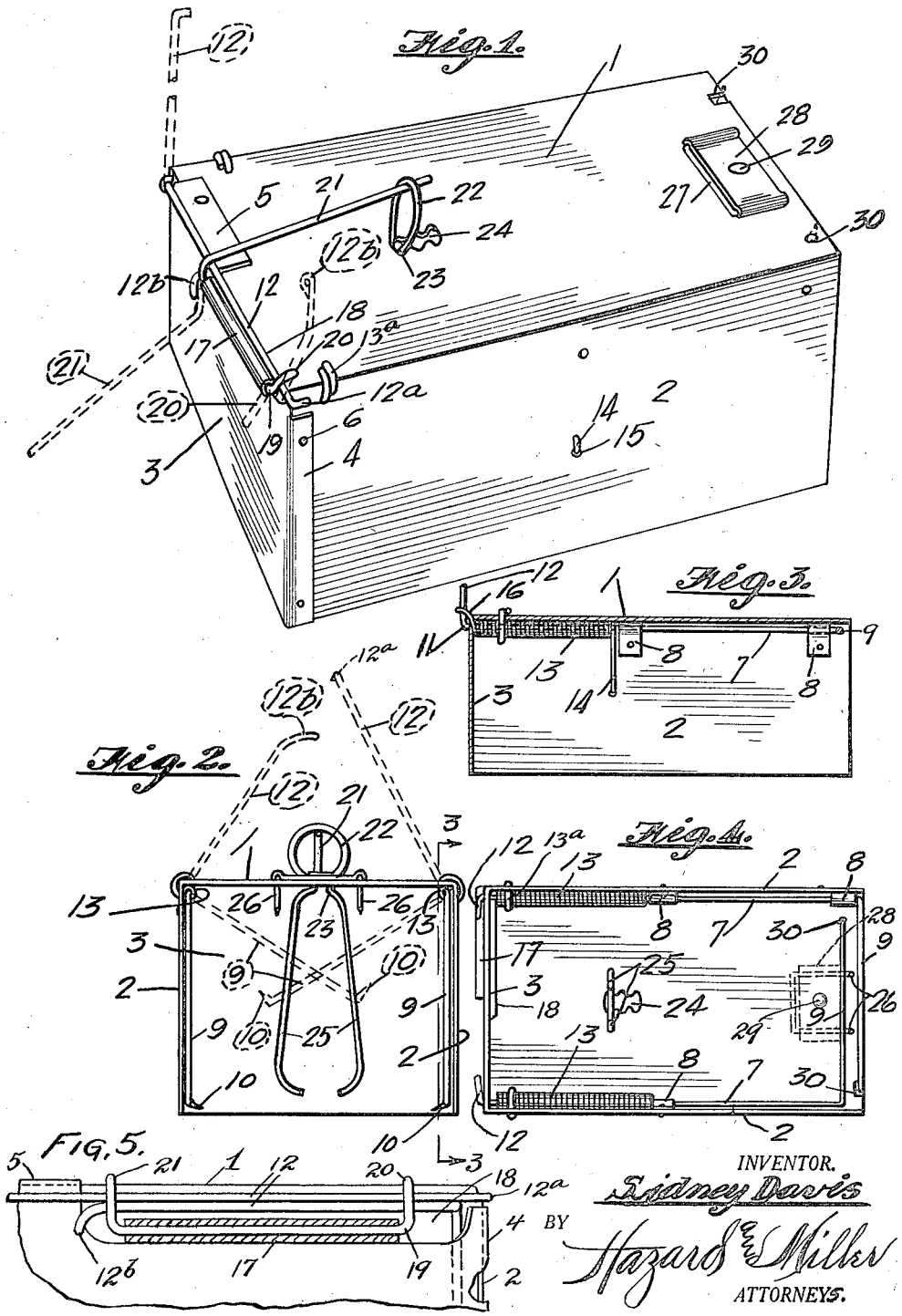

1,452,028

UNITED STATES PATENT OFFICE.

SIDNEY DAVIS, OF LANKERSHIM, CALIFORNIA.

GOPHER TRAP.

Application filed August 22, 1921. Serial No. 494,075.

*To all whom it may concern:*

Be it known that I, SIDNEY DAVIS, a citizen of the United States, residing at Lankershim, in the county of Los Angeles and State of California, have invented new and useful Improvements in Gopher Traps, of which the following is a specification.

This invention relates to gopher traps and has for its object to provide means whereby the sensitiveness of the trap may be adjusted.

Another object is to insure a positive trapping means by which the gopher or similar animal will be held by its top and underside.

The invention will readily be understood from the following description of the accompanying drawings in which:

Fig. 1 is a perspective view of the trap in set position.

Fig. 2 is an end view showing the trap engaging means.

Fig. 3 is a vertical longitudinal section on line 3—3 of Fig. 2, and Fig. 4 is a bottom plan view.

Figure 5 is a fragmentary sectional detail view showing the operating fingers and releasable detent.

The trap comprises the usual box structure having a top 1, side walls 2 and a rear end wall 3. The top and side walls are preferably made of one piece and the rear end wall 3 having vertical flange portions 4 and a horizontal flange 5 suitably fastened to the top and side walls as by rivets 6. The trap engaging means comprises longitudinal rods 7 positioned in the corners between the top and side walls and having suitable bearing supports 8 in the form of clips. Swinging body engaging members 9 are formed by being bent at right angles to the rods 7 and of the same continuous piece, the ends of these members having inwardly extending prongs 10.

The opposite ends of the rods 7 project through the end 3 as shown at 11 and are bent at right angles to both the longitudinal rods and body engaging members as shown at 12. The members 12 form operating fingers which are horizontally and inwardly disposed when the body engaging members are vertically and downwardly disposed and these fingers are held in position by trigger engaging means.

One of the operating fingers 12 extends transversely across the end of the box and the other one terminates intermediate of side walls. The end of one of the fingers 12 is rearwardly bent as at 12$^a$ and the other finger is downwardly curved as at 12$^b$ to assist in placing the body engaging members in set position.

The rods 7 have coiled springs 13 around the same, one end 14 of the spring projecting downwardly and having an outwardly bent portion to engage a hole 15 in each side wall. The other end 16 of the spring being received around the fingers 12, thus when the operating fingers are moved down to a horizontal position the spring 13 is placed under tension and the body engaging members are in a vertical position and when the fingers are released the members 9 are quickly brought up to trap the animal. The springs 13 are held in proper position by looped wires 13$^a$ which extend through the corners of the box adjacent the rear end of thereof, as clearly shown in Figures 1 and 4.

The trigger engaging means for holding these fingers in set position is supported in a transverse bearing member 17 formed by having one portion of the upper edge of the end 3 bent outwardly and upwardly and then curved around to form the bearing 17. A slot 18 is thus provided to receive the fingers. Journaled in the bearing 17 is a rod 19 having an end portion 20 bent upwardly and rearwardly to just overlap the fingers, the other end of the rod being bent upwardly and rearwardly as shown at 21 and adapted to slidably engage the loop portion 22 of the trigger. The loop 22 terminates in a neck 23 positioned in a longitudinal slot 24 in the top of the box, this slot having a plurality of transverse notches to selectively engage the neck 23. Extending downwardly from the neck 23 are the earth engaging members 25.

In the rear end of the top of the box opposite the operating fingers are secondary body engaging members 26 projecting downwardly through the top. These members are formed on the forward ends of a horizontally projecting U-shaped member 27 held to the top by a clip 28 positioned over the longitudinal portions of the U-shaped member and the clip being held by any suitable means such as a rivet 29. Apertures 30 are formed in the top to allow the prongs 10 to pass through the same so as to prevent contact with the top.

In the operation of this device if the gopher or similar animal is of large size the trigger would be positioned in the forward notches 24. The operating fingers being in a vertical position the person setting the device would first place their finger on the curved portion 12^b of the short member and swing it down to a horizontal position into the slot 18. The other member 12 would then be drawn down upon the first member and held in that position while the trigger engaging means 20 and 21 would be brought downwardly to engage the top member 12 which would hold both of the members in position. The loop 22 would then be passed over the end of the wire 21 and the device would be ready to be placed with the open end of the box contiguous to the gopher hole.

In this position, loose earth pushed into the box by the gopher in attempting to fill up the hole will engage and cause the trigger to pivot around the neck and release the wire 21 from the loop, when the trap is sprung the swinging body engaging members engage the underside of the animal and force it into the depending prongs 26 so as to insure positive trapping. If the gopher is thought to be a small one the trigger is then placed in the rearward notch where very little force is required to spring the trap.

Various changes may be made without departing from the spirit of my invention.

What is claimed is:

1. A trap having a frame, body engaging members, means for holding said members in set position, adjustable means for releasing said members; said adjustable means comprising a trigger adapted to engage the first mentioned means, a slot in said frame and a plurality of notches in said slot for selectively receiving said trigger.

2. A trap comprising a box with an open end, swinging and stationary body engaging members in said end, operating fingers to place said members in set position, means for holding said fingers, a trigger having a portion adapted to engage said means and an earth engaging portion adapted to be engaged by the earth to release said body engaging members.

3. A trap comprising a box having an open end, body engaging members disposed at the open end of the box and mounted for swinging movement, means normally acting to move said members to active position, means at the opposite end of the box for retaining the members in inactive position, and a trigger arranged between the ends of the box and releasably engaging the second means, said trigger being adjustably mounted in the box to vary the degree of movement necessary to release said means.

4. A trap comprising a box having an open end, swinging body engaging members in said end, operating fingers to retain said members in set position, means for holding said fingers, a trigger having a portion adapted to engage said means, and a second portion adapted to be engaged by the earth to release said body engaging members, said trigger being adjustably sustained within the box to vary the degree of movement necessary to release the body engaging members.

5. A trap comprising a box having an open end, rods rotatably supported in the box, body engaging members carried by the rods and arranged for movement across the open end of the box, stationary body engaging members depending from the top of the box at the open end and adapted to cooperate with the movable body engaging members, springs associated with the rods for normally urging the movable members into active position, operating fingers secured to the rods, a latch rod adapted to engage the fingers for maintaining the movable members in inactive position against the action of said springs, and a trigger extending into the box and adjustably mounted therein, said trigger releasably engaging said latch rod for holding the latter in latching position with respect to said fingers.

In testimony whereof I have signed my name to this specification.

SIDNEY DAVIS.